US012771155B2

(12) United States Patent
Chen et al.

(10) Patent No.: US 12,771,155 B2
(45) Date of Patent: Oct. 20, 2026

(54) CHARGER CIRCUIT

(71) Applicant: Richtek Technology Corporation, Zhubei City (TW)

(72) Inventors: Kuan-Yu Chen, Taipei (TW); Tsung-Wei Huang, Taipei (TW); Tsan-Huei Wu, Yunlin (TW); Ye-Sing Luo, Hsinchu (TW)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 1002 days.

(21) Appl. No.: 18/058,312

(22) Filed: Nov. 23, 2022

(65) Prior Publication Data

US 2023/0231398 A1 Jul. 20, 2023

Related U.S. Application Data

(60) Provisional application No. 63/301,133, filed on Jan. 20, 2022.

(30) Foreign Application Priority Data

Jun. 21, 2022 (TW) ................................ 111123011

(51) Int. Cl.
*H02J 7/00* (2026.01)
*H02J 7/62* (2026.01)
(Continued)

(52) U.S. Cl.
CPC ................ *H02J 7/855* (2026.01); *H02J 7/62* (2026.01); *H02J 7/90* (2026.01); *H02J 7/94* (2026.01)

(58) Field of Classification Search
CPC .................................................. H02J 2207/20
See application file for complete search history.

(56) References Cited

U.S. PATENT DOCUMENTS 5,241,700 A * 8/1993 Geesen .................. G01S 11/10 455/256
5,892,279 A * 4/1999 Nguyen ............... H10W 40/47 257/691
(Continued)

FOREIGN PATENT DOCUMENTS

CN 103036274 A 4/2013
CN 104518668 A 4/2015
(Continued)

*Primary Examiner* — Tynese V Mcdaniel
(74) *Attorney, Agent, or Firm* — Winston Hsu

(57) ABSTRACT

A charger circuit includes a power stage circuit operating at least one power switch according to an operating signal to convert an input power into an output power to charge a battery and/or to provide the output power to a load, wherein the output power includes a charging power and/or a load power; a control generating the operating signal according to a voltage amplifying signal; and a voltage error amplifier circuit comparing a voltage sensing signal relevant to a charging voltage of the charging power or a load voltage of the load power with a voltage reference level in a voltage hysteresis mode of a discontinuous conduction mode, so as to generate the voltage amplifying signal; wherein the control circuit adjusts the charging voltage or the load voltage according to the voltage amplifying signal, so as to maintain the charging voltage or the load voltage within a predetermined range.

19 Claims, 9 Drawing Sheets

20

(51) Int. Cl.
*H02J 7/90* (2026.01)
*H02J 7/94* (2026.01)

(56) References Cited

U.S. PATENT DOCUMENTS

| | | | | |
|---|---|---|---|---|
| 5,982,160 | A * | 11/1999 | Walters | H02M 3/156 323/222 |
| 7,432,695 | B2 * | 10/2008 | Salerno | H02M 3/156 323/284 |
| 7,750,615 | B2 * | 7/2010 | Jung | H02M 3/156 323/282 |
| 9,035,635 | B2 | 5/2015 | Rosu-Hamzescu | |
| 9,153,987 | B2 * | 10/2015 | Mok | H02J 7/00 |
| 9,559,542 | B2 * | 1/2017 | Deng | H02J 7/94 |
| 9,774,264 | B2 * | 9/2017 | Yang | H02M 3/33507 |
| 10,312,806 | B1 * | 6/2019 | Chen | H02M 3/158 |
| 10,720,838 | B1 * | 7/2020 | Harshey | H02M 1/0061 |
| 10,784,783 | B1 * | 9/2020 | Harshey | H02M 3/1588 |
| 11,038,427 | B1 | 6/2021 | Harshey | |
| 11,495,985 | B1 * | 11/2022 | Kruiskamp | H02J 7/927 |
| 2004/0113600 | A1 * | 6/2004 | Hoshino | H02M 3/156 323/284 |
| 2004/0212347 | A1 * | 10/2004 | Fogg | H02J 7/80 320/127 |
| 2007/0085584 | A1 * | 4/2007 | Walker | H03K 3/037 327/202 |
| 2008/0197814 | A1 * | 8/2008 | Ozawa | H02J 7/94 320/152 |
| 2008/0197898 | A1 * | 8/2008 | Lin | H02M 3/07 327/157 |
| 2010/0201336 | A1 * | 8/2010 | Chen | H02M 3/1588 323/285 |
| 2010/0301822 | A1 * | 12/2010 | Chen | H02M 3/156 323/283 |
| 2012/0019225 | A1 * | 1/2012 | Tsai | H02M 3/156 323/284 |
| 2012/0262136 | A1 * | 10/2012 | Nien | H02M 3/1584 323/272 |
| 2012/0286679 | A1 * | 11/2012 | Liu | H05B 45/46 315/193 |
| 2013/0076323 | A1 * | 3/2013 | Huang | G05F 1/46 323/280 |
| 2013/0181522 | A1 * | 7/2013 | Wang | H02J 7/96 320/164 |
| 2013/0215651 | A1 * | 8/2013 | Liao | H02M 5/40 363/34 |
| 2014/0152243 | A1 * | 6/2014 | Xu | H02M 3/158 320/137 |
| 2014/0210534 | A1 * | 7/2014 | Wang | H03K 7/08 327/175 |
| 2014/0328099 | A1 * | 11/2014 | Lin | H02M 3/33523 363/97 |
| 2014/0340065 | A1 * | 11/2014 | Svorc | H02M 3/1588 323/284 |
| 2016/0323944 | A1 * | 11/2016 | Chen | H05B 45/10 |
| 2016/0352128 | A1 * | 12/2016 | Houston | H02J 7/865 |
| 2017/0085098 | A1 * | 3/2017 | Sporck | H02J 7/02 |
| 2018/0076723 | A1 | 3/2018 | Li | |
| 2018/0083456 | A1 * | 3/2018 | Huang | H02J 7/02 |
| 2018/0083457 | A1 * | 3/2018 | Huang | H02J 7/94 |
| 2018/0083458 | A1 * | 3/2018 | Huang | H02J 7/575 |
| 2018/0083459 | A1 * | 3/2018 | Huang | H02J 7/947 |
| 2018/0115025 | A1 * | 4/2018 | Huang | G05F 1/40 |
| 2018/0278076 | A1 * | 9/2018 | Chen | H02M 1/08 |
| 2019/0006946 | A1 * | 1/2019 | Huang | H02M 1/088 |
| 2019/0229612 | A1 * | 7/2019 | Chen | H02M 3/158 |
| 2020/0014304 | A1 * | 1/2020 | Chang | H02M 1/08 |
| 2020/0076310 | A1 | 3/2020 | Takenaka | |
| 2020/0161959 | A1 * | 5/2020 | Chuang | H02M 3/07 |
| 2020/0412139 | A1 * | 12/2020 | Tian | H02J 7/04 |
| 2021/0099080 | A1 * | 4/2021 | Chen | H02M 3/155 |
| 2021/0211055 | A1 * | 7/2021 | Harshey | H02M 1/0058 |
| 2021/0367513 | A1 * | 11/2021 | Mackay | H02M 1/0025 |
| 2023/0037217 | A1 * | 2/2023 | Zhu | B60L 3/0046 |
| 2024/0305186 | A1 * | 9/2024 | Yu | H02M 1/0009 |
| 2024/0322590 | A1 * | 9/2024 | Nibir | H02J 7/02 |
| 2024/0356459 | A1 * | 10/2024 | Wu | H02M 3/158 |
| 2025/0119056 | A1 * | 4/2025 | Cacciotto | H02M 1/0035 |

FOREIGN PATENT DOCUMENTS

| | | | |
|---|---|---|---|
| CN | 105490518 | A | 4/2016 |
| CN | 108695941 | A | 10/2018 |
| CN | 110190654 | A | 8/2019 |
| TW | 201316653 | A1 | 4/2013 |

* cited by examiner

CHARGER CIRCUIT

CROSS REFERENCE

The present invention claims priority to U.S. 63/301,133 filed on Jan. 20, 2022 and claims priority to TW 111123011 filed on Jun. 21, 2022.

BACKGROUND OF THE INVENTION

Field of Invention

The present invention relates to a charger circuit; particularly, it relates to such charger circuit capable of controlling a charging voltage or a load voltage within a predetermined range.

Description of Related Art

Please refer to FIG. 1A. FIG. 1A shows a schematic diagram of waveforms of a charging voltage Vbat and a charging current Ibat in three operating modes (including a pre-charging mode, a constant current mode, and a constant voltage mode) when a conventional charger circuit is charging a rechargeable battery. Changes in the charging voltage Vbat and the charging current Ibat during the charging process are shown in FIG. LA. In the constant current mode, the charging voltage Vbat increases continuously. When the charging voltage Vbat reaches a predetermined threshold, the operating mode of the charger circuit changes to the constant voltage mode. In the constant voltage mode, the charging current Ibat decreases over time. When the charging current Ibat decreases to a predetermined level, the charger circuit needs to operate in discontinuous conduction mode. If the charger circuit still operates in continuous conduction mode, it will cause a negative current (backward flow of the current) to damage the circuit. Selectively operating in discontinuous conduction mode can improve efficiency, reduce the switching loss of the circuit, and avoid the backward flow of the current.

FIGS. 1B and 1C show schematic diagrams of signal waveforms and transient response waveforms of the conventional charger circuit operating in the aforementioned discontinuous conduction mode, respectively. The charging voltage Vbat and the switching node voltage VLX of the conventional charger circuit are shown in FIG. 1B and FIG. 1C. In a typical application, the charger circuit not only charges the rechargeable battery but also provides power to a load. As shown in FIG. 1B, when the charger circuit operates in the discontinuous conduction mode, the charging current Ibat decreases to the predetermined level. If the load is in light load condition, it can be seen from the waveform diagram that the conventional charger circuit performs pulse skipping. However if the charging voltage Vbat is not well controlled, the charging time will be too long. On the other hand, when the load is unstable, such as when the load changes from light load condition to heavy load condition, the transient response will cause the charging voltage Vbat to drop drastically and generate uneven ripples. It can be seen from the transient response waveform diagram that when the load switches to heavy load condition, the operation cannot change from the pulse skipping mode to other more suitable pulse width modulation control modes in a short time. Because the power is not timely supplied, the load voltage will drop by about 1 volt, and the operating mode is not optimum.

In view of the above, to overcome the drawbacks in the prior art, the present invention proposes a charger circuit, which can precisely control the charging voltage, so as to improve the charging efficiency and enhance the transient response.

SUMMARY OF THE INVENTION

From one perspective, the present invention provides a power device, comprising: a power stage circuit, which is configured to operate at least one power switch according to an operating signal, to convert an input power into an output power via an inductor, wherein the output power is for charging a battery and/or is provided to a load, the output power including a charging power and/or a load power, the charging power including a charging voltage and a charging current, and the load power including a load voltage; a control circuit, which is coupled to the power stage circuit, and is configured to generate the operating signal according to a voltage amplifying signal; and a voltage error amplifier circuit, which is configured to compare a voltage sensing signal relevant to the charging voltage or relevant to the load voltage with a voltage reference level in a voltage hysteresis mode of a discontinuous conduction mode, so as to generate the voltage amplifying signal, wherein the control circuit adjusts the charging voltage or the load voltage according to the voltage amplifying signal, so as to maintain the charging voltage or the load voltage within a predetermined range.

In one embodiment, the voltage reference level includes a voltage upper threshold and a voltage lower threshold, wherein the voltage error amplifier circuit includes: a first voltage comparison circuit, which is configured to compare the voltage sensing signal relevant to the charging voltage or relevant to the load voltage with the voltage upper threshold, so as to generate a first voltage determination signal; a second voltage comparison circuit, which is configured to compare the voltage sensing signal relevant to the charging voltage or relevant to the load voltage with the voltage lower threshold, so as to generate a second voltage determination signal; and a logic circuit, wherein the logic circuit is configured to generate a voltage hysteresis signal according to the first voltage determination signal and the second voltage determination signal; wherein when the voltage sensing signal relevant to the charging voltage or relevant to the load voltage rises from less than the voltage upper threshold to the voltage upper threshold, the voltage hysteresis signal switches to an enabling level, to turn off the at least one power switch in the power stage circuit, so as to decrease the charging voltage or the load voltage; wherein when the voltage sensing signal relevant to the charging voltage or relevant to the load voltage decreases from the voltage upper threshold and reaches the voltage lower threshold, the voltage hysteresis signal switches to a disabling level, to switch the charger circuit to a current hysteresis mode of the discontinuous conduction mode, to switch the inductor by controlling the at least one power switch in the power stage circuit, so as to increase the charging voltage or the load voltage, thereby maintaining the charging voltage or the load voltage within the predetermined range which corresponds to a range between the voltage upper threshold and the voltage lower threshold.

In one embodiment, both the first voltage comparison circuit and the second voltage comparison circuit are comparison circuits having automatic correction function.

In one embodiment, the at least one power switch includes an upper bridge switch and a lower bridge switch; the upper bridge switch is coupled between the input power and a first terminal of the inductor; the lower bridge switch is coupled between the first terminal of the inductor and a ground potential; and a second terminal of the inductor is coupled to the charging power or the load power.

In one embodiment, when the charger circuit is switched to the current hysteresis mode of the discontinuous conduction mode, when an inductor current that flows through the inductor decreases from a current upper threshold to a current lower threshold, the upper bridge switch is turned on and the lower bridge switch is turned off to increase the inductor current, so as to increase the charging voltage or the load voltage at a first increasing rate, and when the inductor current increases from the current lower threshold to the current upper threshold, the upper bridge switch is turned off and the lower bridge switch is turned on to decrease the inductor current, so as to increase the charging voltage or the load voltage at a second increasing rate.

In one embodiment, the first increasing rate is higher than the second increasing rate.

In one embodiment, an average value of the inductor current is lower than or equal to half of the current upper threshold.

In one embodiment, the current lower threshold is zero or a value slightly higher than zero, so as to maintain the inductor current at a positive value.

In one embodiment, the input power includes an input voltage, the output power includes an output voltage, the current lower threshold and the current upper threshold is dynamically adjustable or adaptively adjustable according to the input voltage or the output voltage.

In one embodiment, the charger circuit further comprises a discontinuous conduction mode determination circuit, which is configured to determine the time point when the charger circuit is switched to the discontinuous conduction mode.

In one embodiment, the input power includes an input current, the discontinuous conduction mode determination circuit includes: a current sensing circuit, which is configured to sense the input current, an upper bridge current that flows through the upper bridge switch, an inductor current that flows through the inductor or a lower bridge current that flows through the lower bridge switch, so as to generate a current sensing signal; a transition threshold generation circuit, which is configured to generate a transition threshold signal according to the operating signal and a reference voltage; and a comparison circuit, which is configured to compare the current sensing signal and the transition threshold signal, and to switch the charger circuit to the discontinuous conduction mode when the current sensing signal is lower than the transition threshold signal.

In one embodiment, the control circuit generates an end signal when the charging voltage or the load voltage is not higher than a predetermined lower limit level, to exit the discontinuous conduction mode.

In one embodiment, the charger circuit further comprises a timer circuit, which is configured to time a time-out period when the voltage hysteresis signal is at the disabling level, the time circuit confirms whether the voltage hysteresis signal is still at the disabling level at an end time point of the time-out period, and if the voltage hysteresis signal is still at the disabling level, the timer circuit generates an end signal to exit the discontinuous conduction mode.

In one embodiment, the charger circuit further comprises a current error amplifier circuit, which is configured to compare a charging current sensing signal relevant to the charging current with a charging current reference level, so as to generate a current amplifying signal to adjust the charging current to a predetermined current.

In one embodiment, the charger circuit further comprises a current limiting circuit, which is configured to compare an input current sensing signal relevant to an input current of the input power with an input current reference level, so as to generate a current limiting signal, wherein when the input current sensing signal relevant to the input current is higher than the input current reference level, the control circuit performs overcurrent protection according to the current limiting signal.

In one embodiment, the input current comes from a universal serial bus or a wireless charging interface.

In one embodiment, the charger circuit further comprises a voltage limiting circuit, which is configured to compare an input voltage sensing signal relevant to an input voltage of the input power with an input voltage reference level, so as to generate a voltage limiting signal, wherein when the input voltage sensing signal relevant to the input voltage is lower than the input voltage reference level, the control circuit performs under voltage lockout operation according to the voltage limiting signal.

In one embodiment, the input voltage comes from a universal serial bus or a wireless charging interface.

In one embodiment, the charger circuit further comprises a temperature limiting circuit, which is configured to compare a temperature sensing signal relevant to a load temperature with a temperature reference level, so as to generate a temperature limiting signal, wherein when the temperature sensing signal relevant to the load temperature is higher than the temperature reference level, the control circuit performs high temperature protection according to the temperature limiting signal.

In one embodiment, when the voltage sensing signal relevant to the charging voltage or relevant to the load voltage decreases to the voltage lower threshold, the control circuit confirms whether a priority control signal from anyone of the current error amplifier circuit, the current limiting circuit, the voltage limiting circuit or the temperature limiting circuit is at an enabling level, and if anyone of the priority control signals from the current error amplifier circuit, the current limiting circuit, the voltage limiting circuit and the temperature limiting circuit is at the enabling level, the control circuit generates an end signal to exit the discontinuous conduction mode.

In one embodiment, when the charger circuit operates in the discontinuous conduction mode, in any condition other than when the voltage sensing signal decreases to the voltage lower threshold, the priority control signals from the current error amplifier circuit, the current limiting circuit, the voltage limiting circuit and the temperature limiting circuit are disabled.

Advantages of the present invention include: that the present invention can stabilize the ripples of the charging voltage and provide higher accuracy, and more precisely control the timing of entering or exiting the discontinuous conduction mode, in comparison to the prior art.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations among the process steps and the layers, while the shapes, thicknesses, and widths are not drawn in actual scale.

Figure 1A:
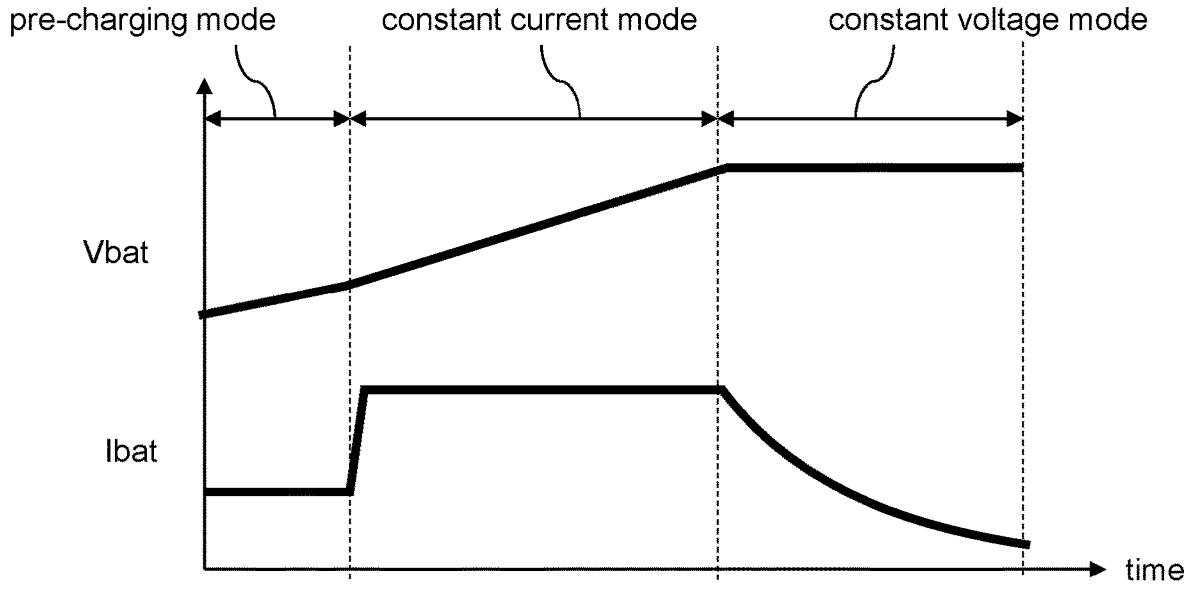
Fig. 1A (Prior art)
FIG. 1A shows a schematic diagram of waveforms of a charging voltage and a charging current in three operating modes when a conventional charger circuit is charging a rechargeable battery.
Figure 1B:
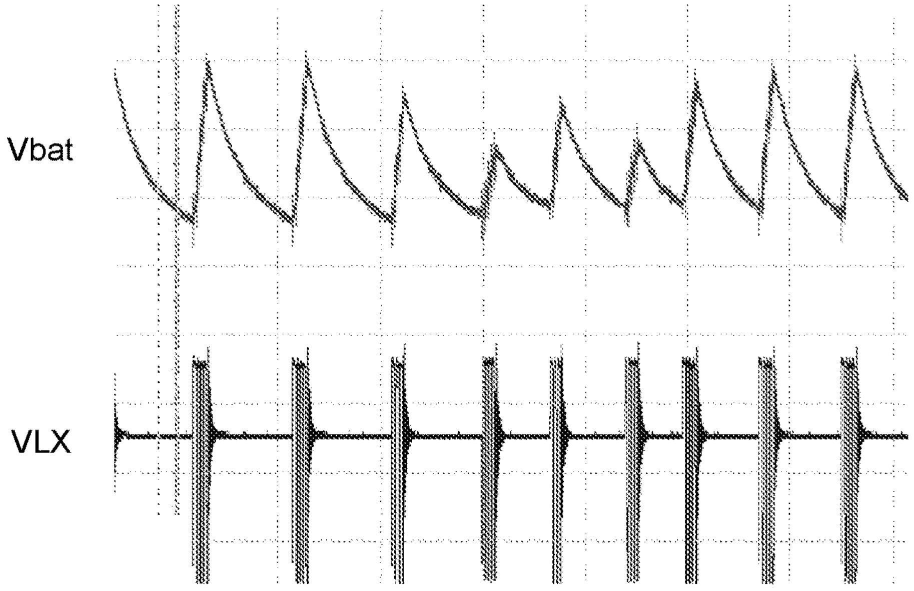
Fig. 1B (Prior art)
FIG. 1B shows a schematic diagram of signal waveforms of a conventional charger circuit.
Figure 1C:
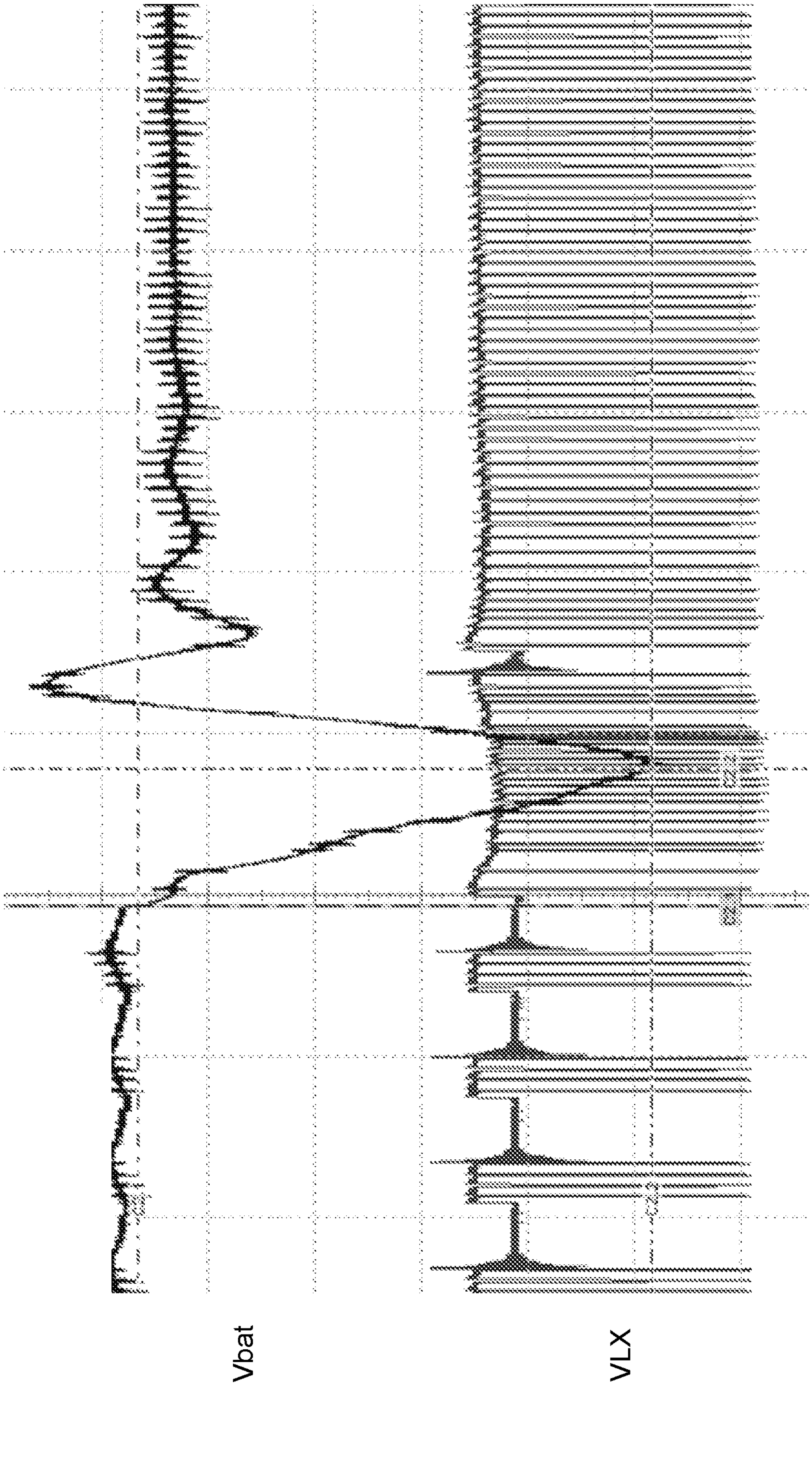
Fig. 1C (Prior art)
FIG. 1C shows a schematic diagram of transient response waveforms of a conventional charger circuit.
Figure 2:
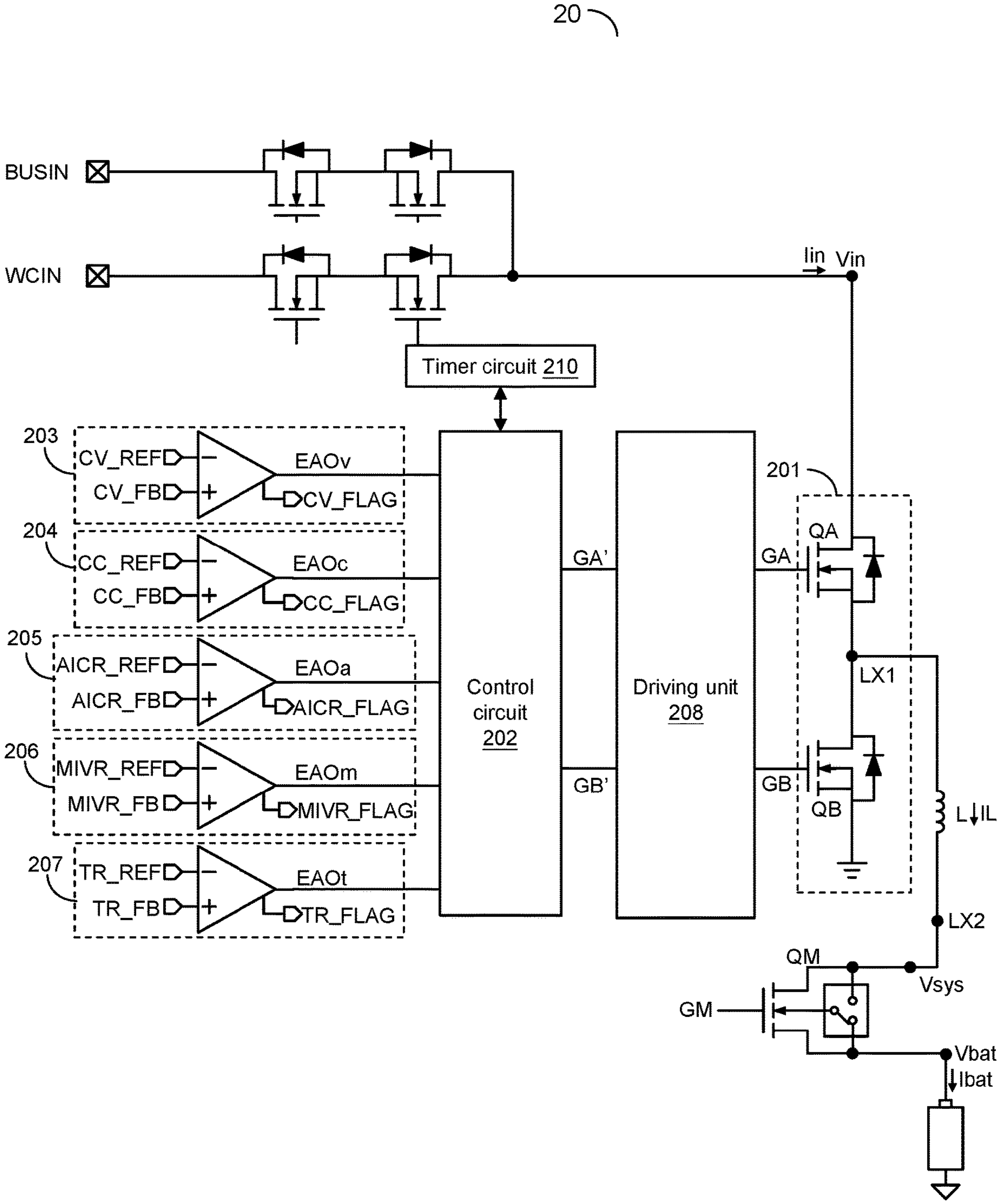
FIG. 2 shows a schematic circuit block diagram of a charger circuit according to an embodiment of the present invention.

FIG. 2 is a schematic circuit block diagram of a charger circuit (i.e. charger circuit 20) according to an embodiment of the present invention. As shown in FIG. 2, the charger circuit 20 of the present invention includes a power stage circuit 201, a control circuit 202, a driving unit 208, a voltage error amplifier circuit 203, a current error amplifier circuit 204, a current limiting circuit 205, a voltage limiting circuit 206, and a temperature limiting circuit 207. The power stage circuit 201 is configured to operate at least one power switch (QA and QB in this embodiment) according to operating signals GA' and GB', so as to convert an input power into an output power via an inductor, wherein the output power is supplied to charge a battery and/or is supplied to a load. In one embodiment, the output power includes a charging power and/or a load power. The output power includes an output current Iout and an output voltage; the charging power includes a charging voltage Vbat and a charging current Ibat, and the load power includes a load voltage Vsys. The control circuit 202 is coupled to the power stage circuit 201 and is configured to generate the operating signals GA' and GB' according to a voltage amplifying signal EAOv, a current amplifying signal EAOc, a current limiting signal EAOa, a voltage limiting signal EAOm and/or a temperature amplifying signal EAOt. The driving unit 208 is coupled to the control circuit 202 and is configured to generate driving signals GA and GB according to the operating signals GA' and GB', so as to operate the power switches QA and QB by the driving signals GA and GB.

In a voltage hysteresis mode of a discontinuous conduction mode, the voltage error amplifier circuit 203 compares a voltage sensing signal CV_FB relevant to the charging voltage Vbat or relevant to the load voltage Vsys with a voltage reference level CV_REF, so as to generate the voltage amplifying signal EAOv. The control circuit 202 adjusts the charging voltage Vbat or the load voltage Vsys according to the voltage amplifying signal EAOv, so as to maintain the charging voltage Vbat or the load voltage Vsys within a predetermined range. The current error amplifier circuit 204 compares a charging current sensing signal CC_FB relevant to the charging current Ibat with a charging current reference level CC_REF, so as to generate a current amplifying signal EAOc to regulate the charging current Ibat at a predetermined current level.

The current limiting circuit compares an input current sensing signal AICR_FB relevant to an input current Iin of the input power with an input current reference level AICR_REF, so as to generate a current limiting signal EAOa. When the input current sensing signal AICR_FB relevant to the input current Iin is higher than the input current reference level AICR_REF, the control circuit 202 performs overcurrent protection according to the current limiting signal EAOa. The overcurrent protection for example can be, stopping the operation of the charger circuit 20 to prevent the input current Iin from being too high. As shown in FIG. 2, the input current Iin for example can come from a universal serial bus input terminal BUSIN or a wireless charging interface input terminal WCIN.

The voltage limiting circuit 206 is configured to compare an input voltage sensing signal MIVR_FB relevant to an input voltage Vin of the input power with an input voltage reference level MIVR_REF, so as to generate a voltage limiting signal EAOm. When the input voltage sensing signal MIVR_FB relevant to the input voltage Vin is lower than the input voltage reference level MIVR_REF, the control circuit 202 performs under voltage lockout operation according to the voltage limiting signal EAOm. The under voltage lockout operation for example can be, stopping the operation of the charger circuit 20 to prevent the charger circuit 20 from operating at the situation of very low input voltage Vin. As shown in FIG. 2, the input voltage Vin comes from the universal serial bus input terminal BUSIN or the wireless charging interface input terminal WCIN.

The temperature limiting circuit 207 is configured to compare a temperature sensing signal TR_FB relevant to a load temperature with a temperature reference level TR_REF, so as to generate a temperature limiting signal EAOt. When the temperature sensing signal TR_FB relevant to the load temperature is higher than the temperature reference level TR_REF, the control circuit 202 performs high temperature protection according to the temperature limiting signal EAOt. The high temperature protection for example can be, stopping the operation of the charger circuit 20 to prevent the charger circuit 20 from operating in an excessively high temperature environment. As shown in FIG. 2, the voltage error amplifier circuit 203, the current error amplifier circuit 204, the current limiting circuit 205, the voltage limiting circuit 206, and the temperature limiting circuit 207 respectively have corresponding priority control signals CV_FLAG, CC_FLAG, AICR_FLAG, MIVR_FLAG, and TR_FLAG.

As shown in FIG. 2, the at least one power switch includes an upper bridge switch QA and a lower bridge switch QB. The upper bridge switch QA is coupled between the input power and the first terminal LX1 of the inductor L, and the lower bridge switch QB is coupled between the first terminal LX1 of the inductor L and a ground potential. The second terminal LX2 of the inductor L is coupled to the charging power and/or the load power. Driving signals GA and GB are respectively configured to control the upper bridge switch QA and the lower bridge switch QB, so as to switch the first terminal LX1 of the inductor L between the input power and the ground potential. A switch QM is coupled between the load power and the charging power, and an operating signal GM is configured to operate the switch QM to determine it is the output power to supply power to the load and/or the rechargeable battery, or the rechargeable battery to supply power to the load.

Figure 10:
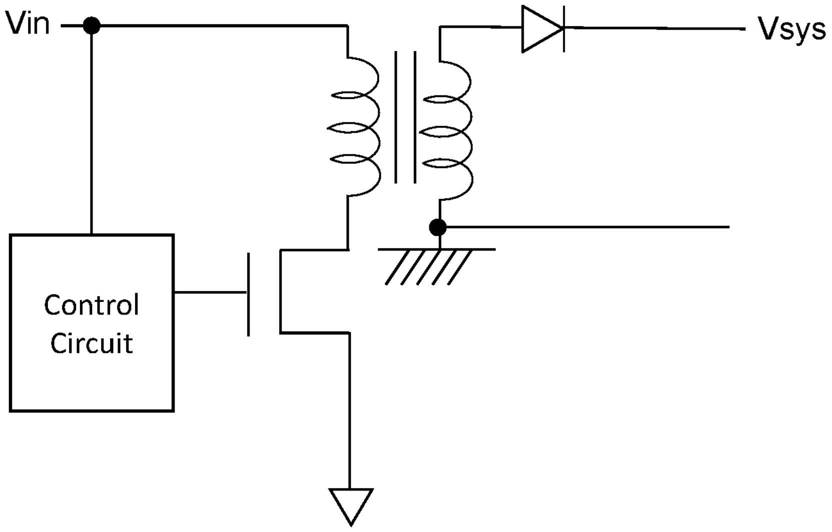
FIG. 10 shows an embodiment of an AC/DC conversion circuit.

The power stage circuit 201 shown in FIG. 2 is a buck power stage circuit of switching inductive power stage circuit. According to the present invention, the power stage circuit 201 is not limited to a switching inductive power stage circuit, but can also be an AC/DC conversion circuit. The switching inductive power stage circuit can be, for example but not limited to, a synchronous or asynchronous buck, boost, buck-boost, or flyback power stage circuit, as shown in FIG. 9A to 9G. FIG. 10 shows an embodiment in which the power stage circuit is an AC/DC conversion circuit.

Figure 3:
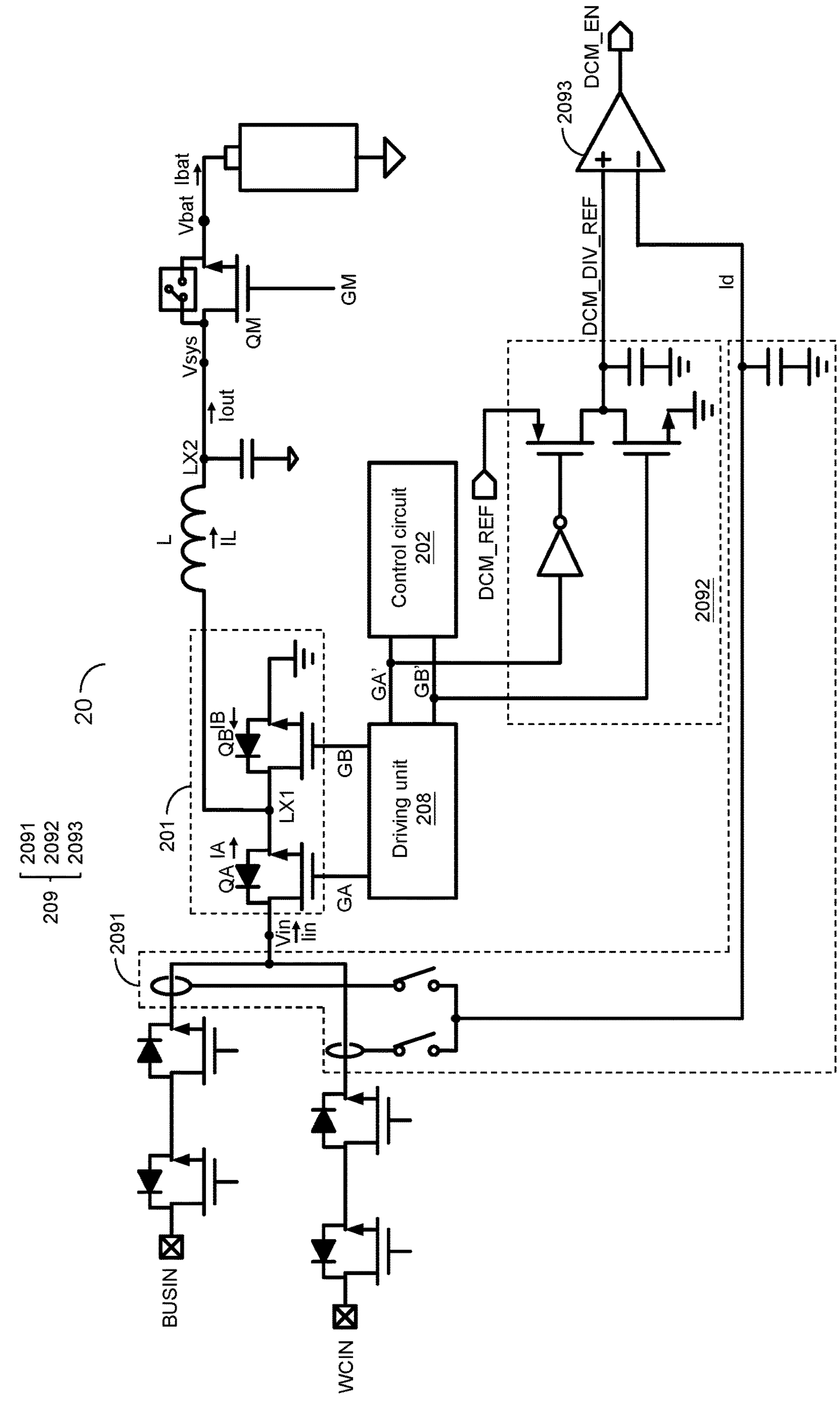
FIG. 3 shows a schematic circuit block diagram of a charger circuit according to an embodiment of the present invention.

FIG. 3 is a schematic circuit diagram of a charger circuit according to an embodiment of the present invention. As shown in FIG. 3, the charger circuit 20 further includes a discontinuous conduction mode determination circuit 209, which is configured to determine the time point when the charger circuit 20 is switched to the discontinuous conduction mode. The discontinuous conduction mode determination circuit 209 includes a current sensing circuit 2091, a transition threshold generation circuit 2092, and a comparison circuit 2093. The current sensing circuit 2091 is configured to sense an inductor current IL, the input current Iin, an upper bridge current IA that flows through the upper bridge switch QA, a lower bridge current IB that flows through the lower bridge switch QB, or a combination of the upper bridge current IA that flows through the upper bridge switch QA and the lower bridge current IB that flows through the lower bridge switch QB, so as to generate a current sensing signal Id. In the present embodiment, the current sensing circuit 2091 is configured to sense the input current Iin. The transition threshold generation circuit 2092 is configured to generate a transition threshold signal DCM_DIV_REF according to operating signals GA' and GB', and a reference voltage DCM_REF. The comparison circuit 2093 is configured to compare the current sensing signal Id and the transition threshold signal DCM_DIV_REF, so as to generate a discontinuous conduction mode determination signal DCM_EN. When the current sensing signal Id is lower than the transition threshold signal DCM_DIV_REF, the discontinuous conduction mode determination signal DCM_EN is at an enabling level, to switch the charger circuit 20 to the discontinuous conduction mode. In one embodiment, the transition threshold generation circuit 2092 includes a P-type transistor and an N-type transistor connected in series, and an inverter. In another embodiment, the transition threshold generation circuit 2092 includes a P-type transistor and an N-type transistor connected in series.

Figure 4:
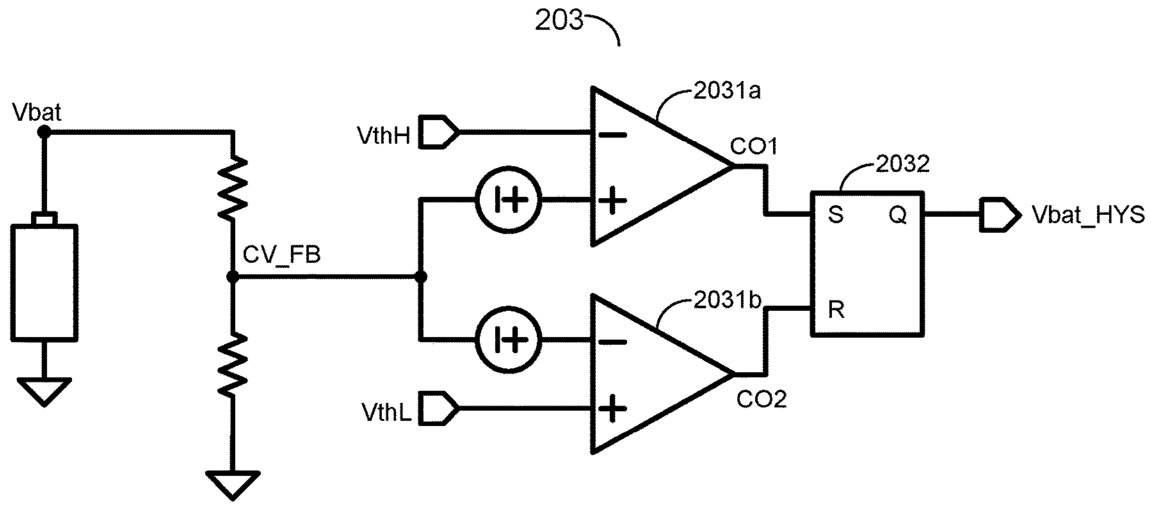
FIG. 4 shows a schematic circuit diagram of a voltage error amplifier circuit in a charger circuit according to an embodiment of the present invention.

FIG. 4 is a schematic circuit diagram of a voltage error amplifier circuit in a charger circuit according to an embodiment of the present invention. As shown in FIG. 4, the voltage error amplifier circuit 203 includes a first voltage comparison circuit 2031*a*, a second voltage comparison circuit 2031*b*, and a logic circuit 2032. The first voltage comparison circuit 2031*a* is configured to compare the voltage sensing signal CV_FB relevant to the charging voltage Vbat or relevant to the load voltage Vsys with the voltage upper threshold VthH, and the second voltage comparison circuit 2031*b* is configured to compare the voltage sensing signal CV_FB relevant to the charging voltage Vbat or relevant to the load voltage Vsys with the voltage lower threshold VthL. The first voltage comparison circuit 2031*a* is configured to generate a first voltage determination signal CO1 according to the voltage sensing signal CV_FB relevant to the charging voltage Vbat or relevant to the load voltage Vsys and the voltage upper threshold VthH, and the second voltage comparison circuit 2031*b* is configured to generate a second voltage determination signal CO2 according to the voltage sensing signal CV_FB relevant to the charging voltage Vbat or relevant to the load voltage Vsys and the voltage lower threshold VthL. The logic circuit 2032 is configured to generate a voltage hysteresis signal Vbat_HYS according to the first voltage determination signal CO1 and the second voltage determination signal CO2, so as to generate the voltage amplifying signal EAOv.

Figure 5:
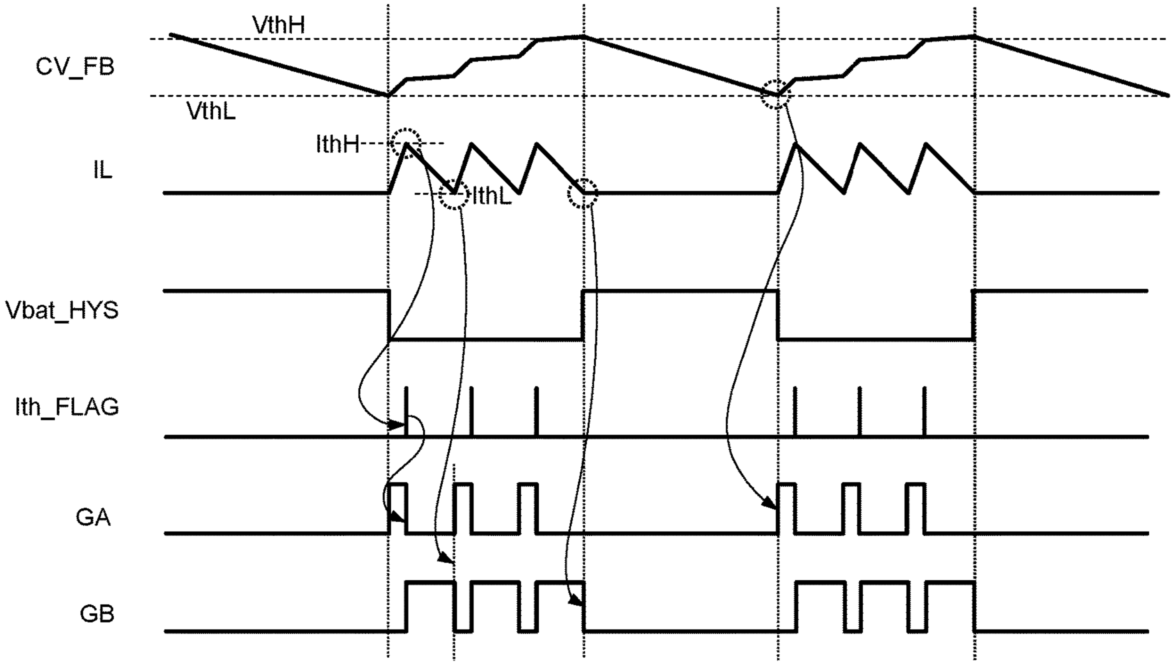
FIG. 5 shows a schematic diagram of signal waveforms of related signals of a charger circuit in a discontinuous conduction mode according to an embodiment of the present invention.

Please refer to FIG. 2, FIG. 4, and FIG. 5 together. When the voltage sensing signal CV_FB relevant to the charging voltage Vbat or relevant to the load voltage Vsys rises from less than the voltage upper threshold VthH to the voltage upper threshold VthH, the voltage hysteresis signal Vbat_HYS switches to an enabling level, to turn off the at least one power switch QA and QB in the power stage circuit 201, so as to decrease the voltage sensing signal CV_FB relevant to the charging voltage Vbat or relevant to the load voltage Vsys. When the voltage sensing signal CV_FB relevant to the charging voltage Vbat or relevant to the load voltage Vsys decreases from the voltage upper threshold VthH and reaches the voltage lower threshold VthL, the voltage hysteresis signal Vbat_HYS switches to a disabling level, to switch the charger circuit 20 to a current hysteresis mode of the discontinuous conduction mode, to switch the first terminal LX of the inductor L between the input power and the ground potential by controlling the at least one power switch QA or QB in the power stage circuit 201, so as to increase the voltage sensing signal CV_FB relevant to the charging voltage Vbat or relevant to the load voltage Vsys. By this mechanism, the voltage sensing signal CV_FB of the charging voltage Vbat or the load voltage Vsys is maintained within the predetermined range between the voltage upper threshold VthH and the voltage lower threshold VthL, whereby the charging voltage Vbat or the load voltage Vsys is precisely controlled to be maintained within a predetermined range to improve the charging efficiency. In one embodiment, both the first voltage comparison circuit 2031*a* and the second voltage comparison circuit 2031*b* are comparison circuits with automatic correction function.

FIG. 5 is a schematic diagram of signal waveforms of related signals of a charger circuit in a discontinuous conduction mode according to an embodiment of the present invention. Please refer to both FIG. 2 and FIG. 5. When the charger circuit 20 is switched to the current hysteresis mode of the discontinuous conduction mode, when the inductor current IL that flows through the inductor L decreases from the level of the current upper threshold IthH to the current lower threshold IthL, the upper bridge switch QA is turned on and the lower bridge switch QB is turned off to increase the inductor current IL, so as to increase the voltage sensing signal CV_FB relevant to the charging voltage Vbat or relevant to the load voltage Vsys at a first increasing rate; when the inductor current IL increases from the level of the current lower threshold IthL to the current upper threshold IthH, a current upper threshold flag signal Ith_FLAG switches to an enabling level, whereby the upper bridge QA switch is turned off and the lower bridge switch QB is turned on to decrease the inductor current IL, so as to increase the voltage sensing signal CV_FB relevant to the charging voltage Vbat or relevant to the load voltage Vsys at a second increasing rate. In one embodiment, the first increasing rate is higher than the second increasing rate. In one embodiment, the average value of the inductor current IL is lower than or equal to half of the current upper threshold IthH.

Preferably, the current lower threshold IthL is zero or a value slightly higher than zero, so as to prevent the inductor current IL from becoming a negative value to cause a current backward flow, whereby the inductor current can be kept at a positive value. In one embodiment, the current lower threshold IthL and the current upper threshold IthH is dynamically adjustable or adaptively adjustable according to the input voltage Vin or the output voltage.

Figure 6:
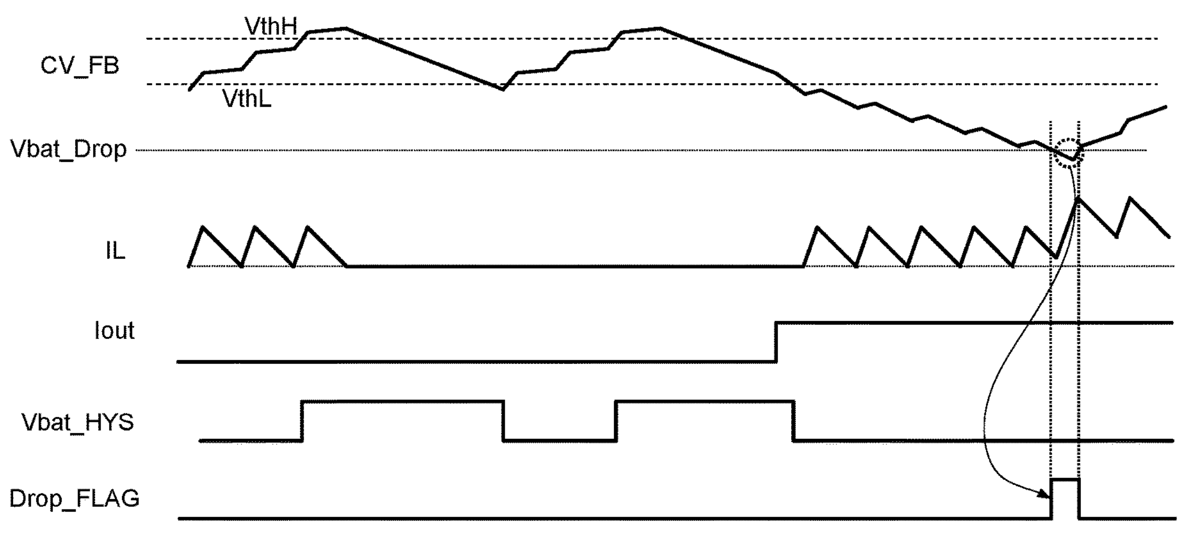
FIG. 6 shows a schematic diagram of signal waveforms of related signals of a charger circuit according to an embodiment of the present invention.

FIG. 6 is a schematic diagram of signal waveforms of related signals of a charger circuit according to an embodiment of the present invention. Please refer to both FIG. 2 and FIG. 6. When the voltage sensing signal CV_FB relevant to the charging voltage Vbat or relevant to the load voltage Vsys is not higher than a predetermined limit level Vbat_Drop, a voltage limit flag signal Drop_FLAG switches to an enabling level to trigger the control circuit 202 to generate an end signal, so as to exit the discontinuous conduction mode, wherein the predetermined limit level Vbat_Drop is lower than the voltage lower threshold VthL. When the voltage sensing signal CV_FB is not higher than the predetermined limit level Vbat_Drop, if the charger circuit 20 operates in the current hysteresis mode of the discontinuous conduction mode, but the voltage sensing signal CV_FB cannot be controlled between the voltage upper threshold VthH and the voltage lower threshold VthL, this indicates that the load switches from a light load to a heavy load, and it is t=required to exit the discontinuous conduction mode, to enhance the transient response of the charger circuit 20 and avoid the wrong selection in the operating mode of the charger circuit.

Figure 7:
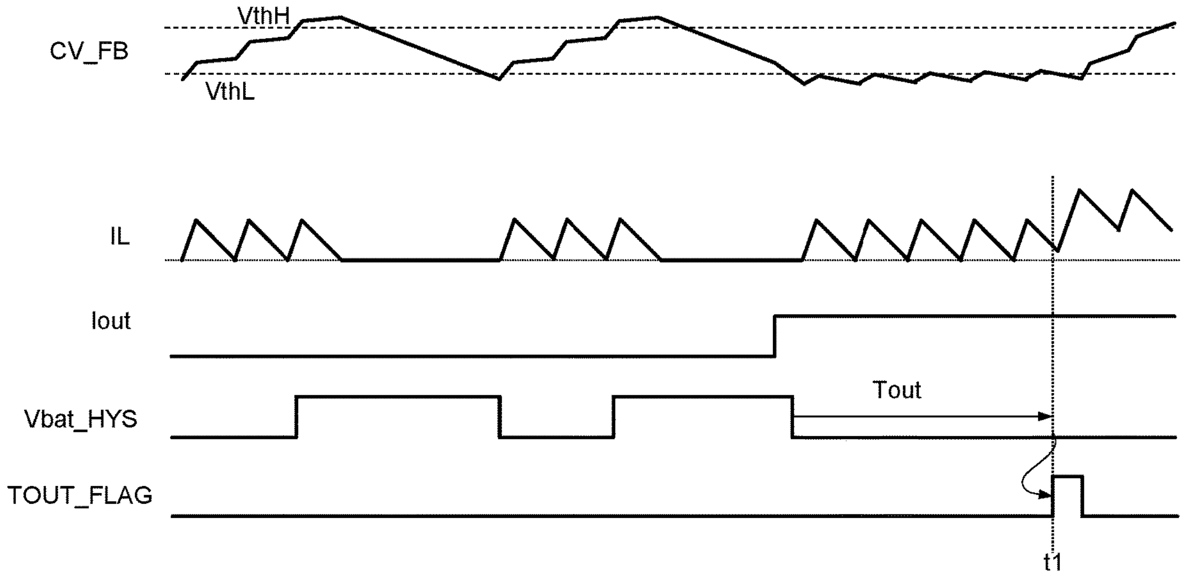
FIG. 7 shows a schematic diagram of signal waveforms of related signals of a charger circuit according to another embodiment of the present invention.

FIG. 7 is a schematic diagram of signal waveforms of related signals of a charger circuit according to another embodiment of the present invention. Please refer to both FIG. 2 and FIG. 7. The charger circuit 20 of the present invention further includes a timer circuit 210, which is configured to time a time-out period Tout when the voltage hysteresis signal Vbat_HYS is at a disabling level. The timer circuit 210 confirms whether the voltage hysteresis signal Vbat_HYS is still at the disabling level at an end time point t1 of the time-out period Tout. If the voltage hysteresis signal Vbat_HYS is still at the disabling level, a time-out flag signal TOUT_FLAG switches to an enabling level, which indicates the time-out of the discontinuous conduction mode, whereby the control circuit 202 generates an end signal to exit the discontinuous conduction mode. When the average value of the output current Iout is equal to the average value of the inductor current IL, the voltage sensing signal CV_FB is kept always near the voltage lower threshold VthL, and the voltage hysteresis signal Vbat_HYS is kept always at the disabling level, which indicates that the inductor current IL is totally provided to the load and there is no current for charging the rechargeable battery. Thus, when the time-out flag signal TOUT_FLAG switches to the enabling level, the discontinuous conduction mode should be ended.

Figure 8:
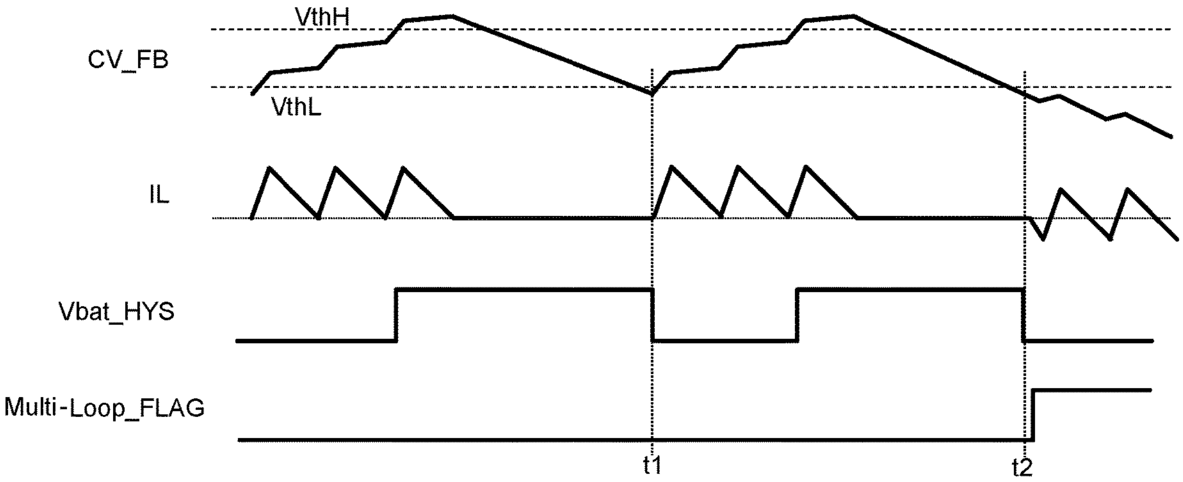
FIG. 8 shows a schematic diagram of signal waveforms of related signals of a charger circuit according to yet another embodiment of the present invention.
Figure 9A:
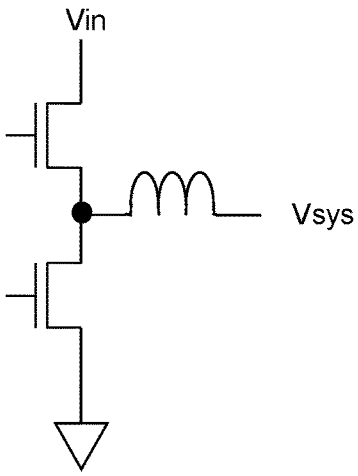
FIG. 9A to 9G show synchronous or asynchronous buck, boost, buck-boost, and flyback power stage circuits of switching inductive power stage circuits.
Figure 9B:
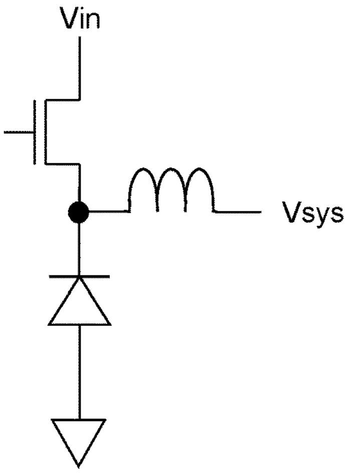
Figure 9C:
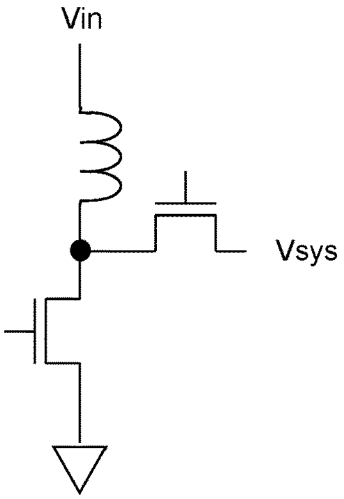
Figure 9D:
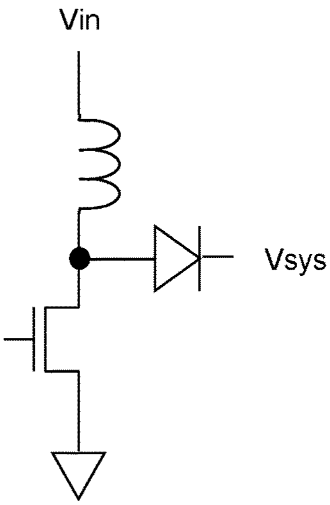
Figure 9E:
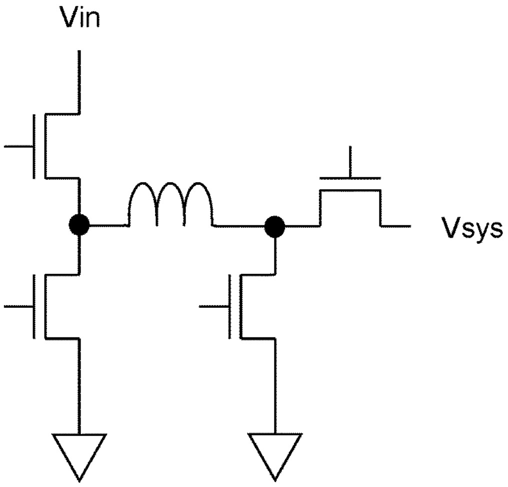
Figure 9F:
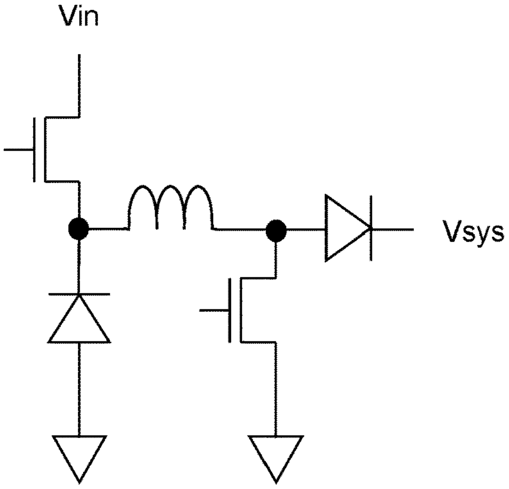
Figure 9G:
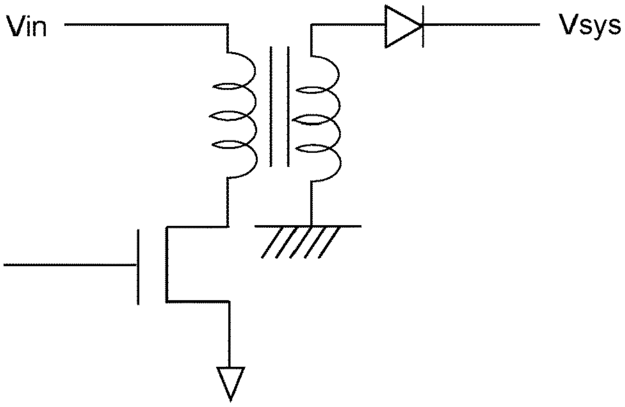

FIG. 8 is a schematic diagram of signal waveforms of related signals of a charger circuit according to yet another embodiment of the present invention. Please refer to FIG. 2, FIG. 4, and FIG. 8 together. Whenever the voltage sensing signal CV_FB relevant to the charging voltage Vbat or relevant to the load voltage Vsys decreases to the voltage lower threshold VthL (e.g., at time points t1 and t2), the control circuit 202 confirms whether any of the corresponding priority control signals CV_FLAG, CC_FLAG, AICR_FLAG, MIVR_FLA, and TR_FLAG from the current error amplifier circuit 204, the current limiting circuit 205, the voltage limiting circuit 206 and the temperature limiting circuit 207 is at the enabling level. For example, if the control circuit 202 confirms any of the corresponding priority control signals from the current error amplifier circuit 204, the current limiting circuit 205, the voltage limiting circuit 206 and the temperature limiting circuit 207 is at the enabling level at the time point t2, an interruption flag signal Multi-Loop_FLAG switches to an enabling level to trigger the control circuit to generate the end signal, so as to exit the discontinuous conduction mode.

Please refer to FIG. 2 again. When the charger circuit 20 operates in the discontinuous conduction mode, the priority control signals CV_FLAG, CC_FLAG, AICR_FLAG, MIVR_FLAG, and TR_FLAG from the current error amplifier circuit 204, the current limiting circuit 205, the voltage limiting circuit 206 and the temperature limiting circuit 207 are disabled. The priority control signals CV_FLAG, CC_FLAG, AICR_FLAG, MIVR_FLAG, and TR_FLAG are checked once when the voltage sensing signal CV_FB decreases to the voltage lower threshold VthL, so as to improve the accuracy of the charging voltage Vbat or the load voltage Vsys.

The present invention provides a charger circuit as described above. The present invention can stabilize the ripples of the charging voltage and provide higher accuracy, and more precisely control the timing of entering or exiting the discontinuous conduction mode, in comparison to the prior art.

The present invention has been described in considerable detail with reference to certain preferred embodiments thereof. It should be understood that the description is for illustrative purpose, not for limiting the broadest scope of the present invention. Those skilled in this art can readily conceive variations and modifications within the spirit of the present invention. The various embodiments described above are not limited to being used alone; two embodiments may be used in combination, or a part of one embodiment may be used in another embodiment. For example, other process steps or structures, such as a metal silicide layer, may be added. For another example, the lithography process step is not limited to the mask technology but it can also include electron beam lithography, immersion lithography, etc. Therefore, in the same spirit of the present invention, those skilled in the art can think of various equivalent variations and various combinations, and there are many combinations thereof, and the description will not be repeated here. The scope of the present invention should include what are defined in the claims and the equivalents.

What is claimed is:

1. A charger circuit, comprising:

a power stage circuit, which is configured to operate at least one power switch according to an operating signal, to convert an input power into an output power via an inductor, wherein the output power is for charging a battery and/or is provided to a load, the output power including a charging power and/or a load power, the charging power including a charging voltage and a charging current, and the load power including a load voltage;

a control circuit, which is coupled to the power stage circuit, and is configured to generate the operating signal according to a voltage amplifying signal; and a voltage error amplifier circuit, which is configured to compare a voltage sensing signal relevant to the charging voltage or relevant to the load voltage with a voltage reference level in a voltage hysteresis mode of a discontinuous conduction mode, so as to generate the voltage amplifying signal, wherein the control circuit adjusts the charging voltage or the load voltage according to the voltage amplifying signal, so as to maintain the charging voltage or the load voltage within a predetermined range;

wherein the voltage reference level includes a voltage upper threshold and a voltage lower threshold, wherein the voltage error amplifier circuit includes:

a first voltage comparison circuit, which is configured to compare the voltage sensing signal relevant to the charging voltage or relevant to the load voltage with the voltage upper threshold, so as to generate a first voltage determination signal;

a second voltage comparison circuit, which is configured to compare the voltage sensing signal relevant to the charging voltage or relevant to the load voltage with the voltage lower threshold, so as to generate a second voltage determination signal; and a logic circuit, wherein the logic circuit is configured to generate a voltage hysteresis signal according to the first voltage determination signal and the second voltage determination signal;

wherein when the voltage sensing signal relevant to the charging voltage or relevant to the load voltage rises from less than the voltage upper threshold to the voltage upper threshold, the voltage hysteresis signal switches to an enabling level, to turn off the at least one power switch in the power stage circuit, so as to decrease the charging voltage or the load voltage;

wherein when the voltage sensing signal relevant to the charging voltage or relevant to the load voltage decreases from the voltage upper threshold and reaches the voltage lower threshold, the voltage hysteresis signal switches to a disabling level, to switch the charger circuit to a current hysteresis mode of the discontinuous conduction mode, to switch the inductor by controlling the at least one power switch in the power stage circuit, so as to increase the charging voltage or the load voltage, thereby maintaining the charging voltage or the load voltage within the predetermined range which corresponds to a range between the voltage upper threshold and the voltage lower threshold; and wherein the charger circuit further comprises a timer circuit, which is configured to time a time-out period when the voltage hysteresis signal is at the disabling level, the timer circuit confirming whether the voltage hysteresis signal is still at the disabling level at an end time point of the time-out period, and if the voltage hysteresis signal is still at the disabling level, the timer circuit generates an end signal to exit the discontinuous conduction mode.

2. The charger circuit of claim 1, wherein both the first voltage comparison circuit and the second voltage comparison circuit are comparison circuits having automatic correction function.

3. The charger circuit of claim 1, wherein the at least one power switch includes an upper bridge switch and a lower bridge switch, the upper bridge switch being coupled between the input power and a first terminal of the inductor, the lower bridge switch being coupled between the first terminal of the inductor and a ground potential, and a second terminal of the inductor being coupled to the charging power or the load power.

4. The charger circuit of claim 3, wherein when the charger circuit is switched to the current hysteresis mode of the discontinuous conduction mode, when an inductor current that flows through the inductor decreases from a current upper threshold to a current lower threshold, the upper bridge switch is turned on and the lower bridge switch is turned off to increase the inductor current, so as to increase the charging voltage or the load voltage at a first increasing rate, and when the inductor current increases from the current lower threshold to the current upper threshold, the upper bridge switch is turned off and the lower bridge switch is turned on to decrease the inductor current, so as to increase the charging voltage or the load voltage at a second increasing rate.

5. The charger circuit of claim 4, wherein the first increasing rate is higher than the second increasing rate.

6. The charger circuit of claim 4, wherein an average value of the inductor current is lower than or equal to half of the current upper threshold.

7. The charger circuit of claim 4, wherein the current lower threshold is zero or a value slightly higher than zero, so as to maintain the inductor current at a positive value.

8. The charger circuit of claim 4, wherein the input power includes an input voltage, and the output power includes an output voltage, and wherein the current lower threshold and the current upper threshold are dynamically adjustable or adaptively adjustable according to the input voltage or the output voltage.

9. The charger circuit of claim 3, further comprising a discontinuous conduction mode determination circuit, which is configured to determine the time point when the charger circuit is switched to the discontinuous conduction mode.

10. The charger circuit of claim 9, wherein the input power includes an input current, and the discontinuous conduction mode determination circuit includes:

a current sensing circuit, which is configured to sense the input current, an upper bridge current that flows through the upper bridge switch, an inductor current that flows through the inductor or a lower bridge current that flows through the lower bridge switch, so as to generate a current sensing signal;

a transition threshold generation circuit, which is configured to generate a transition threshold signal according to the operating signal and a reference voltage; and a comparison circuit, which is configured to compare the current sensing signal and the transition threshold signal, and to switch the charger circuit to the discontinuous conduction mode when the current sensing signal is lower than the transition threshold signal.

11. The charger circuit of claim 1, wherein the control circuit generates an end signal when the charging voltage or the load voltage is not higher than a predetermined lower limit level, to exit the discontinuous conduction mode.

12. The charger circuit of claim 1, further comprising a current error amplifier circuit, which is configured to compare a charging current sensing signal relevant to the charging current with a charging current reference level, so as to generate a current amplifying signal to adjust the charging current to a predetermined current.

13. The charger circuit of claim 12, further comprising a current limiting circuit, which is configured to compare an input current sensing signal relevant to an input current of the input power with an input current reference level, so as to generate a current limiting signal, wherein when the input current sensing signal relevant to the input current is higher than the input current reference level, the control circuit performs overcurrent protection according to the current limiting signal.

14. The charger circuit of claim 13, wherein the input current comes from a universal serial bus or a wireless charging interface.

15. The charger circuit of claim 13, further comprising a voltage limiting circuit, which is configured to compare an input voltage sensing signal relevant to an input voltage of the input power with an input voltage reference level, so as to generate a voltage limiting signal, wherein when the input voltage sensing signal relevant to the input voltage is lower than the input voltage reference level, the control circuit performs under voltage lockout operation according to the voltage limiting signal.

16. The charger circuit of claim 15, wherein the input voltage comes from a universal serial bus or a wireless charging interface.

17. The charger circuit of claim 15, further comprising a temperature limiting circuit, which is configured to compare a temperature sensing signal relevant to a load temperature with a temperature reference level, so as to generate a temperature limiting signal, wherein when the temperature sensing signal relevant to the load temperature is higher than the temperature reference level, the control circuit performs high temperature protection according to the temperature limiting signal.

18. The charger circuit of claim 17, wherein when the voltage sensing signal relevant to the charging voltage or relevant to the load voltage decreases to the voltage lower threshold, the control circuit confirms whether a priority control signal from any one of the current error amplifier circuit, the current limiting circuit, the voltage limiting circuit or the temperature limiting circuit is at an enabling level, and if any one of the priority control signals from the current error amplifier circuit, the current limiting circuit, the voltage limiting circuit and the temperature limiting circuit is at the enabling level, the control circuit generates an end signal to exit the discontinuous conduction mode.

19. The charger circuit of claim 18, wherein when the charger circuit operates in the discontinuous conduction mode, in any condition other than when the voltage sensing signal decreases to the voltage lower threshold, the priority control signals from the current error amplifier circuit, the current limiting circuit, the voltage limiting circuit and the temperature limiting circuit are disabled.

* * * * *